Figure 1:
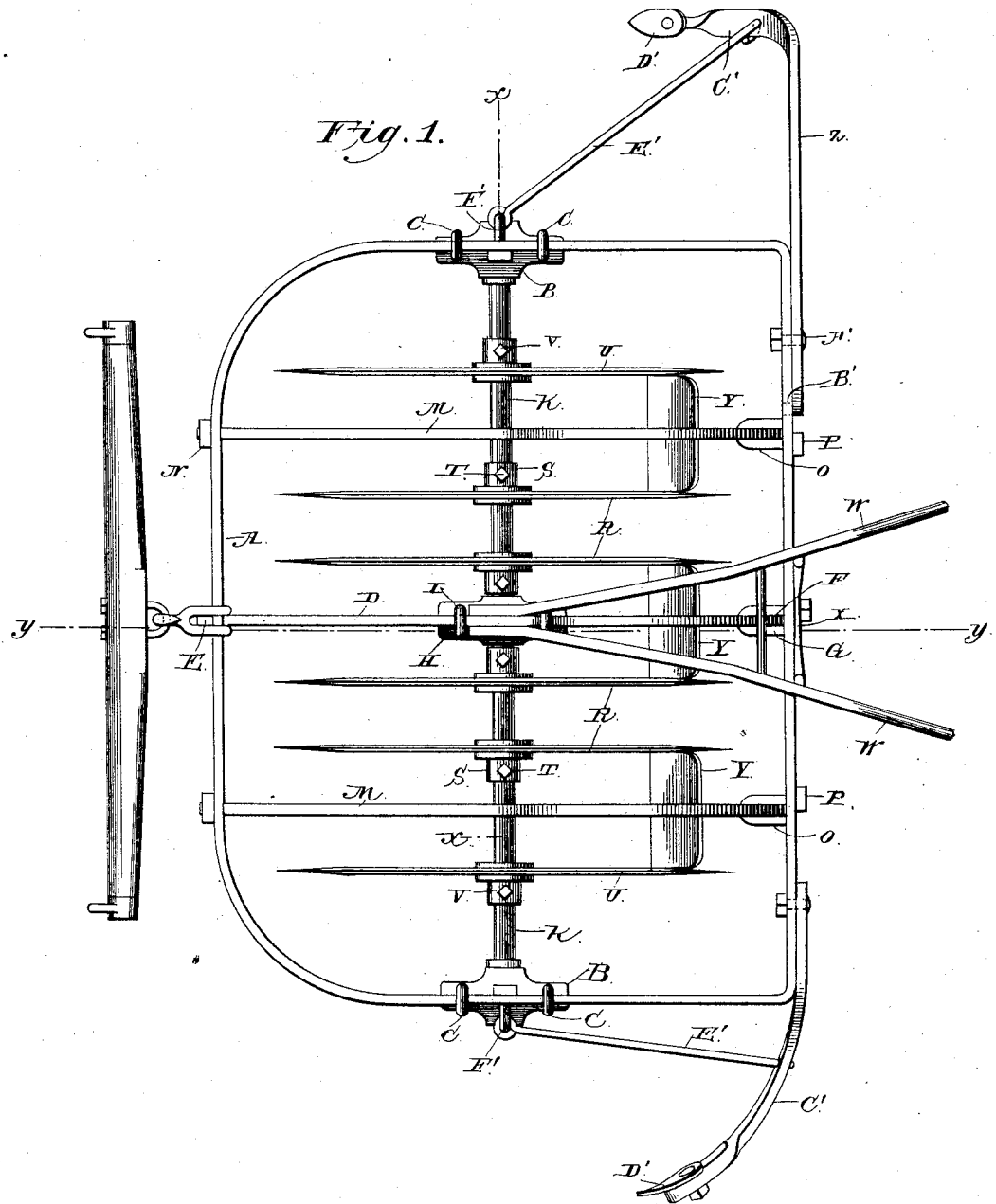

(No Model.) 2 Sheets—Sheet 1.

J. LINDY & H. H. HOOD.
COTTON CHOPPER AND CULTIVATOR.

No. 371,955. Patented Oct. 25, 1887.

Witnesses
M. Fowler
E. L. Siggers

Inventor
Joel Lindy and
Henry H. Hood
By their Attorneys

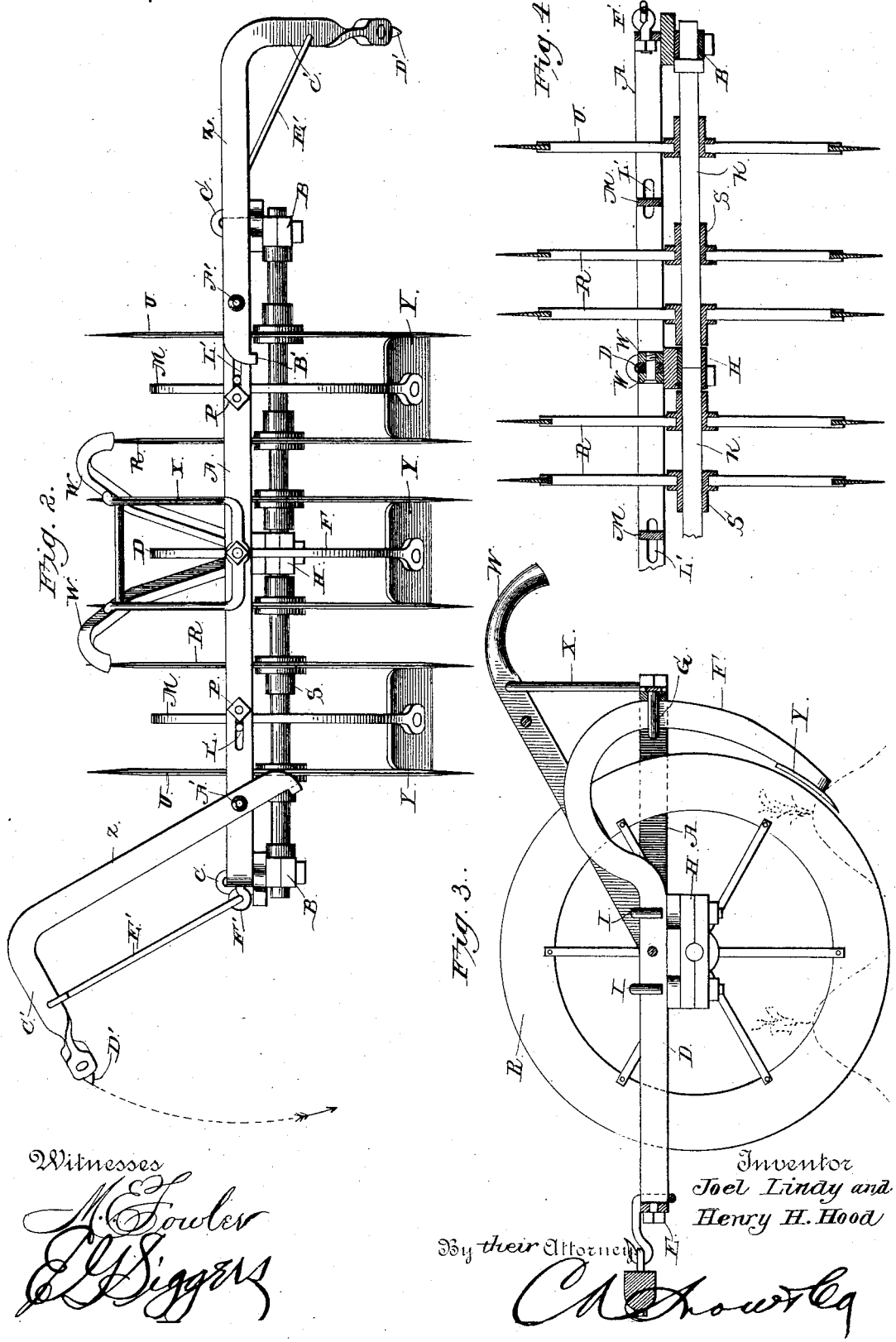

UNITED STATES PATENT OFFICE.

JOEL LINDY AND HARVEY H. HOOD, OF CHARLOTTE, NORTH CAROLINA.

COTTON CHOPPER AND CULTIVATOR.

SPECIFICATION forming part of Letters Patent No. 371,955, dated October 25, 1887.

Application filed August 2, 1887. Serial No. 245,965. (No model.)

*To all whom it may concern:*

Be it known that we, JOEL LINDY and HARVEY H. HOOD, citizens of the United States, residing at Charlotte, in the county of Mecklenburg and State of North Carolina, have invented a new and useful Improvement in Cotton Choppers and Cultivators, of which the following is a specification.

Our invention relates to an improvement in cotton choppers and cultivators; and it consists in the peculiar construction and combination of devices, that will be more fully set forth hereinafter, and particularly pointed out in the claims.

In the accompanying drawings, Figure 1 is a top plan view of a cotton chopper and cultivator embodying our improvements. Fig. 2 is a rear elevation of the same. Fig. 3 is a longitudinal sectional view taken on the line $y\ y$ of Fig. 1. Fig. 4 is a vertical transverse sectional view taken on the line $x\ x$ of Fig. 1.

A represents the main frame of the cultivator and chopper, which is of the shape shown in Fig. 1. Under the side bars of the said frame, at the centers thereof, are secured bearing-blocks B by means of clip-bolts C.

D represents a beam which has its front end reduced to form a threaded stud that passes through an opening in the center of the front side of the frame A, and is secured thereto by a clamping-nut, E. The rear end of the beam is first curved upward and then downward to form a standard, F, which is connected to the rear side of the frame by means of a clip-bolt, G.

H represents a bearing-block which is secured under the center of beam D by means of clip-bolts I.

K represents a pair of shafts which are arranged in line with each other, and have their outer ends journaled in the bearing-blocks B and their inner ends journaled in the block H.

The front and rear sides of frame A are provided at points midway between the beam D and the ends of the frame with longitudinal slots L.

M represents a pair of beams which are similar in size and shape to the beam D, and have their front ends reduced and passed through the slots L in the front side of the frame and provided with clamping-nuts N, and their rear ends connected to the rear side of the frame by means of clip-bolts O, which extend rearward through the slots in the rear side of frame A and provided with clamping-nuts P. By means of the slots L the beams M may be adjusted laterally toward and from the central beam, D, for the purpose that will be hereinafter described.

R represents two pairs of wheels or disks of suitable size, which are secured to the shafts K, at suitable distances from the inner ends thereof, and are arranged between the beams D and M. The hubs of the said wheels or disks are provided with extended sleeves S, in which work set-screws T, by means of which the wheels or disks may be adjusted longitudinally on the shaft and secured thereto at any desired point.

U represents a pair of wheels or disks which are precisely similar in size and construction to the wheels R, and are secured on the shafts K between the beams M and the ends of the frame A, said wheels or disks being also provided with set-screws V, to secure them at any desired adjustment on the shafts.

To the central beam, D, are bolted the front ends of a pair of handles, W, which handles extend upward and rearward beyond the rear side of the frame, and are braced in position by means of a yoke, X, which is secured on the rear end of the clip-bolt G. To the lower ends of the standards of the beams D and M are secured chopping-shovels Y, the sides of which are at right angles to their lower edges, said chopping-shovels being thereby made square. The size of these shovels may be varied to suit the requirements of the case.

The shovels attached to the standards or beams M are arranged between the wheels U and the outer wheels R, and the shovels attached to the standards of the central beam, D, are arranged between the opposing sides of the inner wheels R, the spaces between the said shovels being equal and of any width desired, according to the number of plants it is desirable to leave to form "stands."

Z represents a pair of marker-arms which are arranged on the rear side of the frame A, and are fulcrumed thereto at suitable distances from the ends of the frame by means of pivotal bolts A'. The inner ends of the said marker-arms are provided with forward-extending stops or studs, B', adapted to engage the lower side of the rear bar of the frame A when the marker-arms are turned to a horizontal position on the frame. At the outer ends of the marker-arms are formed downward and forward extending curved standards C', to the lower ends of which are attached marking-shovels D'.

E' represents brace-rods which have their rear ends hooked to the standards C' and their front ends engaged with the eyes of eyebolts F', that are attached to the ends of the frame A, at the centers thereof.

The operation of our invention is as follows: The wheels are first adjusted on the axles to the required distance apart, and the beams M are adjusted so as to arrange their shovels or chopping-hoes at the correct distance from the central shovel or hoe, according to the number of plants it is desired to leave in each stand. One of the marker-arms is raised on one end of the frame and the other marking-arm is turned down to a horizontal position thereon, so as to cause its shovel or plow to make a slight furrow in the ground on one side of the machine. A horse is attached to the machine, and the plowman directs the machine transversely across the rows of cotton-plants. The plants which pass between the opposing sides of the pairs of wheels or disks R are left undisturbed in the ridges, and the shovels arranged between the wheels R and U and the opposing sides of the inner wheels R cut off the tops of the ridges as the machine passes over them and drops them into the furrows, thus destroying the intermediate plants between the stands or hills which are left to grow. The edges of the wheels or disks are sharpened, and are thereby adapted to cut carefully through the crust of the earth and to separate the plants which are to be chopped out from those that are permitted to stand. As the chopping hoes or shovels work directly in rear of the wheels or disks, the latter serve as fenders to prevent the dirt which is stirred by the hoes or shovels from falling laterally onto the plants in the spaces between the shovels and injuring the same. This operation of removing the intervening plants from between the stands, with the earth in which they are growing, serves to cultivate the plants which are left, and as the earth taken from the top of each ridge is deposited by the shovels or choppers in the water-furrow between the ridges the said furrows are thereby filled, and consequently the ground is reduced to a level condition, which is the most advantageous for the growth of the cotton-plants.

By placing the wheels or disks as far apart as may be necessary, and by adjusting the beams M and substituting larger and smaller choppers and hoes for those previously employed, the machine may be adapted to leave the stands of cotton at any desired distance apart, and to leave as many plants to a stand or hill as may be desired.

The marking shovel, which is permitted to work on the land side of the machine, makes a slight furrow, along which the center of the machine is guided on the return-trip across the field. The horse is attached to a hook or clevis on the front side of the machine in front of the central shovel or chopper.

As the machine is adapted to be driven across the ridges on which the cotton-plants are growing in rows, it arranges the stands, which are permitted to grow in check-rows, so that the plants may be cultivated both ways.

In order to adapt the machine for use for the cultivation of the cotton-plants after the same have been chopped, it is only necessary to remove the wheels or disks R from the shafts K, which may be readily done by first taking the bearing-boxes from the central beams and the ends of the frame A and substituting bull-tongues or cultivating-shovels of any suitable preferred construction for the chopping hoes or shovels hereinbefore described.

By having the shafts or axles K of the wheels or disks U made separate, one shaft or axle carrying one set of wheels or disks on one side of the beam D and the other shaft or axle carrying the other set of wheels or disks on the opposite side of the beam D, it will be seen that when turning the machine one shaft or axle will turn forward and the other will revolve backward, and thus a shorter turn can be effected.

Having thus described our invention, we claim—

1. In a machine for chopping and cultivating cotton, the combination of the frame A, the shaft K, journaled therein, the beams extending longitudinally across the frame and connecting the front and rear sides thereof and having the chopping hoes or shovels attached thereto, and the wheels or disks arranged in pairs on the shaft and on opposite sides of the chopping-shovels, said wheels being adjustable on the shaft and the beams being adjustable in frame A, for the purpose set forth, substantially as described.

2. The combination, in a cotton chopper and cultivator, of the frame A, the shaft K, journaled therein, the disks or wheels secured to the shaft, adjustable thereon, and having the sharpened peripheral edges, the beams attached to and extending longitudinally across the frame between the pairs of wheels and adjustable laterally on the frame, and the square chopping shovels or hoes attached to the beams and arranged between the pairs of wheels or disks, substantially as described.

3. The combination of the frame A, the shaft journaled therein, the wheels arranged in pairs and attached to the shaft, the chopping hoes or shovels arranged between the pairs of wheels, the marker-arms Z, having the marker-shovels at their outer ends and the studs B' at their inner ends, for the purpose set forth, and the bolts A', pivoting the marker-arms at points near their inner ends to the rear side of the frame A, substantially as described.

4. The combination of the open frame A, having the slots L in its front and rear sides at points midway between the center and sides, the longitudinal beam D, having standard F, the clip-bolt G, connecting the rear end of the beam to the rear side of the frame, the bearing-block H, secured to the beam D, the beams M, the clip-bolts P, whereby the said beams M are rendered laterally adjustable, the bearing-blocks B, attached to the sides of the frame in line with the block H, the shaft-sections K, having their ends journaled in the blocks H and B, the circular disks secured to the shaft-sections, adjustable thereon and arranged in pairs, and the chopping hoes or shovels attached to the standards of the beams and arranged between the pairs of disks, substantially as described.

In testimony that we claim the foregoing as our own we have hereto affixed our signatures in presence of witnesses.

JOEL LINDY.
    HARVEY H. HOOD.

Witnesses to signature of Lindy:
 E. G. SIGGERS,
 WM. NELSON MOORE.

Witnesses to signature of Hood:
 E. T. HENDERSON,
 A. BERRYHILL.